United States Patent
Sato et al.

(10) Patent No.: US 6,945,074 B2
(45) Date of Patent: Sep. 20, 2005

(54) VAPOR-COMPRESSION REFRIGERANT CYCLE SYSTEM

(75) Inventors: Yukimasa Sato, Kariya (JP); Motohiro Yamaguchi, Hoi-gun (JP); Hiromi Ohta, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/869,725

(22) Filed: Jun. 16, 2004

(65) Prior Publication Data

US 2004/0255602 A1 Dec. 23, 2004

(30) Foreign Application Priority Data

Jun. 19, 2003 (JP) .................................. 2003-174679

(51) Int. Cl.[7] ................................................ F25B 1/06
(52) U.S. Cl. ............................ 62/500; 62/228.5; 62/512
(58) Field of Search ......................... 62/502, 500, 228.5, 62/228.3, 222, 114, 512

(56) References Cited

U.S. PATENT DOCUMENTS 5,890,370 A * 4/1999 Sakakibara et al. ........... 62/222
6,484,523 B2 * 11/2002 Kuroda et al. .............. 62/228.3
6,550,265 B2    4/2003 Takeuchi et al.
6,670,067 B2 * 12/2003 Sato et al. ..................... 429/34
2003/0131611 A1    7/2003 Oshitani et al.

FOREIGN PATENT DOCUMENTS

JP      5-96931      4/1993

* cited by examiner

*Primary Examiner*—Melvin Jones
(74) *Attorney, Agent, or Firm*—Harness, Dickey & Pierce, PLC

(57) ABSTRACT

In a vapor-compression refrigerant cycle system, a switching device is provided to switch one of a first mode where high-pressure refrigerant discharged from a compressor is directly introduced to an exterior heat exchanger and a second mode where the high-pressure refrigerant is directly introduced to an interior heat exchanger. When the second mode is set, the pressure of the high-pressure refrigerant is set higher than a predetermined pressure by a constant-pressure control valve. Accordingly, it can prevent heating capacity of the interior heat exchanger from being greatly changed even when thermal load of the vapor-compression refrigerant cycle system is changed, and heating capacity of the interior heat exchanger can be improved in the second mode.

9 Claims, 6 Drawing Sheets

COOLING MODE

HEATING MODE

VAPOR-COMPRESSION REFRIGERANT CYCLE SYSTEM

CROSS REFERENCE TO RELATED APPLICATION

This application is based on Japanese Patent Application No. 2003-174679 filed on Jun. 19, 2003, the disclosure of which is incorporated herein by reference.

FIELD OF THE INVENTION

The present invention relates to a vapor-compression refrigerant cycle system in which refrigerant at a low pressure side is evaporated by absorbing heat from a low-temperature side and is radiated to a high-temperature side. The vapor-compression refrigerant cycle system is suitably used for a vehicle air conditioner.

BACKGROUND OF THE INVENTION

In a conventional vehicle air conditioner, air to be blown into a vehicle compartment (passenger compartment) is heated by using exhaust heat generated in the vehicle, such as engine-cooling water, as a heating source. In this case, when the temperature of engine-cooling water is low, a sufficient heating capacity cannot be obtained.

To overcome this problem, in a vehicle air conditioner described in JP-A-5-96931, high-pressure refrigerant discharged from a compressor is supplied to an interior heat exchanger so as to heat air to be blown toward a passenger compartment. However, the refrigerant discharged from the interior heat exchanger is decompressed by a fixed throttle such as a capillary tube. Accordingly, when a thermal load at a high-pressure side or a low pressure side changes, the pressure of high-pressure refrigerant is changed; and therefore, the heating capacity of the interior heat exchanger is greatly changed.

SUMMARY OF THE INVENTION

In view of the above-described problems, it is an object of the present invention to provide a vapor-compression refrigerant cycle system which has a sufficient heating capacity even immediately after a heating start operation.

According to the present invention, a vapor-compression refrigerant cycle system includes a compressor for drawing and compressing refrigerant, an exterior heat exchanger disposed outside a compartment to perform heat exchange between refrigerant and air outside the compartment, an interior heat exchanger disposed inside the compartment to perform heat exchange between refrigerant and air to be blown into the compartment, a switching means disposed to switch one of a first mode where refrigerant discharged from the compressor is supplied to the exterior heat exchanger and a second mode where the refrigerant discharged from the compressor is supplied to the interior heat exchanger, and a pressure control device which controls a pressure of the refrigerant discharged from the compressor to be higher than a predetermined pressure when the second mode is set by the switching means. Accordingly, even when a thermal load condition at a low-pressure side or a high-pressure side is changed in the vapor-compression refrigerant cycle system, it can restrict a heating capacity of the interior heat exchanger from being largely changed in the second mode. Accordingly, a sufficient heating capacity can be obtained in the interior heat exchanger even immediately after a heating start operation.

The vapor-compression refrigerant cycle system can be further provided with an ejector which includes a nozzle for decompressing and expanding refrigerant, and a pressure-increasing portion which draws gas refrigerant evaporated at a low-pressure side by a refrigerant stream jetted from the nozzle and increases a refrigerant pressure to be sucked to the compressor by converting expansion energy to pressure energy. In this case, a gas-liquid separator is provided for separating refrigerant flowing from the ejector into gas refrigerant and liquid refrigerant. Generally, the gas-liquid separator has a gas refrigerant outlet coupled to the compressor and a liquid refrigerant outlet coupled to the low-pressure side. In this case, the nozzle decompresses the refrigerant flowing from the exterior heat exchanger when the first mode is set by the switching means, and the pressure control device is a throttle device which controls the pressure of the refrigerant discharged from the compressor and decompresses the refrigerant flowing from the interior heat exchanger when the second mode is set by the switching means.

Alternatively, the vapor-compression refrigerant cycle system is provided with a first decompression means for decompressing refrigerant flowing out of the exterior heat exchanger in iso-enthalpy in the first mode. In addition, the pressure control device is a second decompressing means for decompressing the refrigerant flowing out of the interior heat exchanger in the second mode. Generally, the second decompression means has a throttle open degree that is controllable such that the pressure of the refrigerant discharged from the compressor becomes higher than the predetermined pressure in the second mode.

For example, in the vapor-compression refrigerant cycle system, carbon dioxide can be used as the refrigerant. In this case, the refrigerant discharged from the compressor can be set equal to or higher than the critical pressure of the refrigerant. Further, the vapor-compression refrigerant cycle system can be suitably used for a vehicle air conditioner. In this case, the compartment is a passenger compartment of a vehicle, the interior heat exchanger is disposed in an air conditioning case for defining an air passage through which air flows into the passenger compartment, the air conditioning case has therein a heater core for heating air in the air passage by using exhaust heat generated in the vehicle as a heat source, and the interior heat exchanger is disposed downstream from the heater core in an air flow direction in the air conditioning case. Accordingly, air to be blown into the passenger compartment can be effectively heated.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first embodiment of the present invention will be now described with reference to FIGS. 1 to 4. In the first embodiment, the vapor-compression refrigerant cycle system of the present invention is typically used for a vehicle air conditioner.

Figure 1:
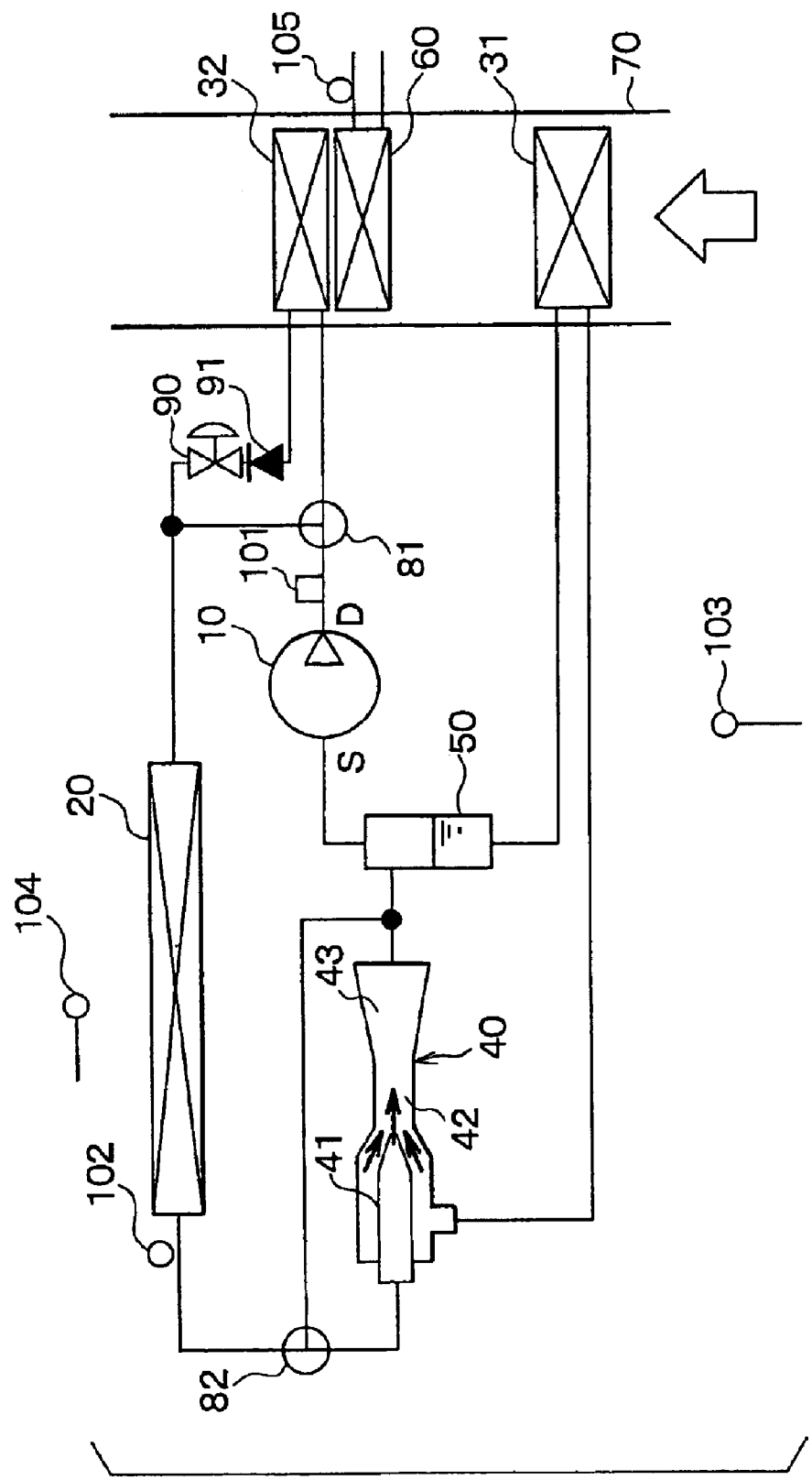
FIG. 1 is a schematic diagram showing a vapor-compression refrigerant cycle system used for an air conditioner, according to a first preferred embodiment of the present invention.

A compressor 10 shown in FIG. 1 is electrically driven to draw and compress refrigerant. For example, in this embodiment, the compressor 10 is a fixed displacement type compressor driven by an electrical motor. However, the compressor 10 can be constructed with a variable displacement compressor which is operated by a vehicle engine for running to continuously change the variable displacement.

In an exterior heat exchanger 20, refrigerant discharged from the compressor 10 is heat-exchanged with air (outside air) outside a vehicle compartment (e.g., passenger compartment). A first interior heat exchanger 31 and a second interior heat exchanger 32 are disposed so that refrigerant in the vapor-compression refrigerant cycle system is heat-exchanged with air to be blown into the vehicle compartment. The first interior heat exchanger 31 and the second interior heat exchanger 32 are disposed in an air conditioning case 70 for defining an air passage through which air flows into the vehicle compartment. The first interior heat exchanger 31 is disposed at an upstream air side of the second interior heat exchanger 32 in the air conditioning case 70. Further, a heater core 60 is provided in the air conditioning case 70 for heating air to be blown into the vehicle compartment by using exhaust heat generated in the vehicle, such as engine-cooling water, as a heating source. The heater core 60 is arranged in the air conditioning case 70 downstream from the first interior heat exchanger 31 and upstream from the second interior heat exchanger 32 in an air flow direction of the air conditioning case 70. Generally, the heater core 60 is arranged adjacent to the second interior heat exchanger 32 in the air flow direction, as shown in FIG. 1.

A blower (not shown) for blowing air into the air conditioning case 70 is disposed at a position upstream from the interior heat exchanger 31 in the air flow direction. Further, an inside/outside air switching device is provided to introduce inside air (i.e., air inside the vehicle compartment) and outside air (i.e., air outside the vehicle compartment) into the blower.

An ejector 40 decompresses and expands refrigerant at a high pressure side in the vapor-compression refrigerant cycle system so that gas refrigerant evaporated at a low pressure side is sucked therein by pumping operation, and converts expansion energy of refrigerant to pressure energy of the refrigerant to increase a pressure of refrigerant to be sucked into the compressor 10.

The ejector 40 includes a nozzle 41, a mixing portion 42 and a diffuser 43. The nozzle 41 decompresses and expands the refrigerant at the high pressure side by converting the pressure energy (pressure head) of the refrigerant to the speed energy (speed head) thereof. In the mixing portion 42, the refrigerant evaporated at the low pressure side is sucked by high-speed refrigerant flow jetted from the nozzle 41. In the diffuser 43, the speed energy of refrigerant is converted to the pressure energy so that the pressure of refrigerant to be sucked into the compressor 10 is increased, while the refrigerant (drive stream) jetted from the nozzle 41 and the refrigerant (suction stream) drawn into the mixing portion 42 are further mixed.

In the mixing portion 42, the drive stream of refrigerant from the nozzle 41 and the suction stream of the refrigerant from the evaporator 30 are mixed so that their momentum sum is conserved, thereby increasing refrigerant pressure. In the diffuser 43, because a refrigerant passage sectional area gradually increases toward its outlet side, the refrigerant speed energy (dynamic pressure) is converted to the refrigerant pressure energy (static pressure). Here, the refrigerant pressure is increased not only in the diffuser 43, but also in the mixing portion 42. Therefore, in the ejector 40, a pressure-increasing portion is constructed with the mixing portion 42 and the diffuser 43. In the first embodiment, a cross-sectional area of the mixing portion 42 is made constant until the diffuser 43. However, the mixing portion 42 may be tapered so that the cross-sectional area becomes larger toward the diffuser 43. The nozzle 41 has a throttle portion at which the passage sectional area is reduced in maximum.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle having the smallest passage area in its refrigerant passage. However, a nozzle tapered toward its outlet side can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to an inlet side of the evaporator 30. Accordingly, in the ejector cycle, liquid refrigerant flows into the evaporator 30 while refrigerant from the exterior heat exchanger 20 is decompressed in the nozzle 41 of the ejector 40.

Further, a first three-way valve 81 is provided at a refrigerant discharge side of the compressor 10 so as to switch one of an operation state (second mode) where high-pressure refrigerant discharged from the compressor 10 is directly supplied to the second interior heat exchanger 32, and an operation state (first mode) where the high-pressure refrigerant discharged from the compressor 10 is directly supplied to the exterior heat exchanger 20. In addition, a second three-way valve 82 is provided at a refrigerant outlet side of the exterior heat exchanger 20 so as to switch one of an operation state where the refrigerant flowing out of the exterior heat exchanger 20 is supplied to the nozzle 41 of the ejector 40 and an operation state where the refrigerant flowing out of the exterior heat exchanger 20 is supplied to the gas-liquid separator 50 while bypassing the ejector 40.

A constant-pressure control valve 90 is disposed at a refrigerant outlet side of the second interior heat exchanger 32 to have a constant-pressure throttle mechanism. The constant-pressure control valve 90 decompresses the refrigerant flowing from the second interior heat exchanger 32, and changes its throttle open degree so that the pressure at the high-pressure refrigerant before being decompressed becomes equal to or higher than a predetermined degree. A check valve 91, which only allows a refrigerant flow from the second interior heat exchanger 32 toward the exterior heat exchanger 20, is disposed upstream of the constant-pressure control valve 90 in a refrigerant flow.

The constant-pressure control valve 90 is a mechanical variable throttle device in which its throttle open degree is adjusted by using a balance between an elastic force of an elastic means such as a spring and a refrigerant pressure so that the pressure of the high-pressure refrigerant discharged from the compressor 10 is set equal to or higher than the predetermined pressure. In this embodiment, the elastic force of the elastic means such as the spring is adjusted so that the predetermined pressure of the high-pressure refrigerant is set about to 12 Mpa±0.5 Mpa in accordance with a pressure-resistance limit value of the compressor 10 and the second interior heat exchanger 32.

A pressure sensor 101 is a refrigerant pressure detection unit, which is arranged at the refrigerant discharge side of the compressor 10 to detect the pressure of high-pressure refrigerant discharged from the compressor 10. That is, the pressure sensor 101 is provided to detect the pressure of the high-pressure refrigerant before being decompressed. A refrigerant temperature sensor 102 is a refrigerant temperature detection unit for detecting a temperature of refrigerant flowing out of the exterior heat exchanger 20. An inside air temperature sensor 103 is a temperature detection unit for detecting an air temperature (inside air temperature) inside the vehicle compartment, and an outside air temperature sensor 104 is a temperature detection unit for detecting an air temperature (outside air temperature) outside the vehicle compartment. Further, a water temperature sensor 105 is an exhaust heat temperature detecting unit for detecting an exhaust heat temperature such as the temperature of the engine cooling water.

The detection values of the sensors 101 to 105 are input into an electronic control unit (ECU), and the ECU controls components such as the compressor 10, the first and second three-way valves 81, 82 and the blower.

Next, operation of the air conditioner with the vapor-compression refrigerant cycle system will be now described.
(1) Cooling Mode (General Operation)

Figure 2:
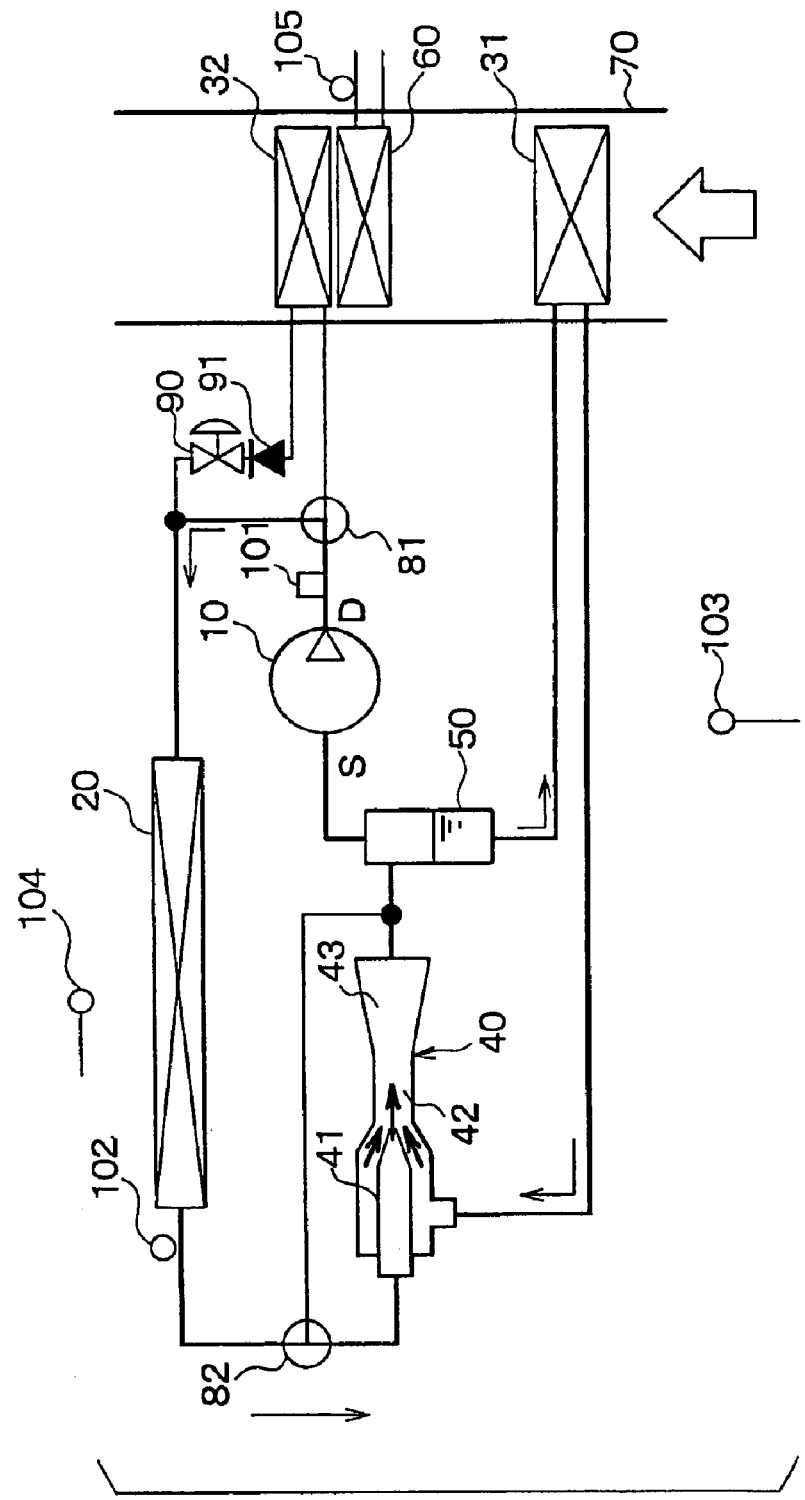
FIG. 2 is a schematic diagram showing a refrigerant flow in the vapor-compression refrigerant cycle system in a cooling mode, according to the first embodiment.

The cooling mode of the air conditioner is a cooling operation for cooling air to be blown into the vehicle compartment, or a dehumidifying-cooling operation for dehumidifying the vehicle compartment by cooling air to be blown into the vehicle compartment. In the cooling mode, as shown in FIG. 2, the first three-way valve 81 is operated so that all the refrigerant discharged from the compressor 10 is directly supplied to the exterior heat exchanger 20, and the second three-way valve 82 is operated so that high-pressure refrigerant flowing out of the exterior heat exchanger 20 flows into the nozzle 41 of the ejector 40. Therefore, refrigerant cooled in the exterior heat exchanger 20 is decompressed and expended in iso-entropy in the nozzle 41 of the ejector 40, and flows into the mixing portion 42 by a speed equal to or higher than the sound speed.

By the pumping operation due to the entrainment of the high-speed refrigerant jetted from the nozzle 41 into the mixing portion 42, the refrigerant evaporated in the first interior heat exchanger 31 is drawn into the mixing portion 42. Therefore, low-pressure refrigerant circulates the gas-liquid separator 50→the first interior heat exchanger 31→the pressure increasing portion of the ejector 40→the gas-liquid separator 50, in this order. The low-pressure refrigerant is evaporated in the first interior heat exchanger 31 by absorbing heat from air passing through the air conditioning case 70, so that air to be blown into the vehicle compartment is cooled.

Then, the refrigerant discharged from the ejector 40 flows into the gas-liquid separator 50.

In this embodiment, carbon dioxide is used as the refrigerant. In addition, when a thermal load (cooling load) in the first interior heat exchanger 31 is larger, the pressure of high-pressure refrigerant to be introduced to the nozzle 41 of the ejector 40 is increased by the compressor 10 to a pressure equal to or higher than the critical pressure of the refrigerant, so that a necessary cooling capacity can be obtained.

Figure 3:
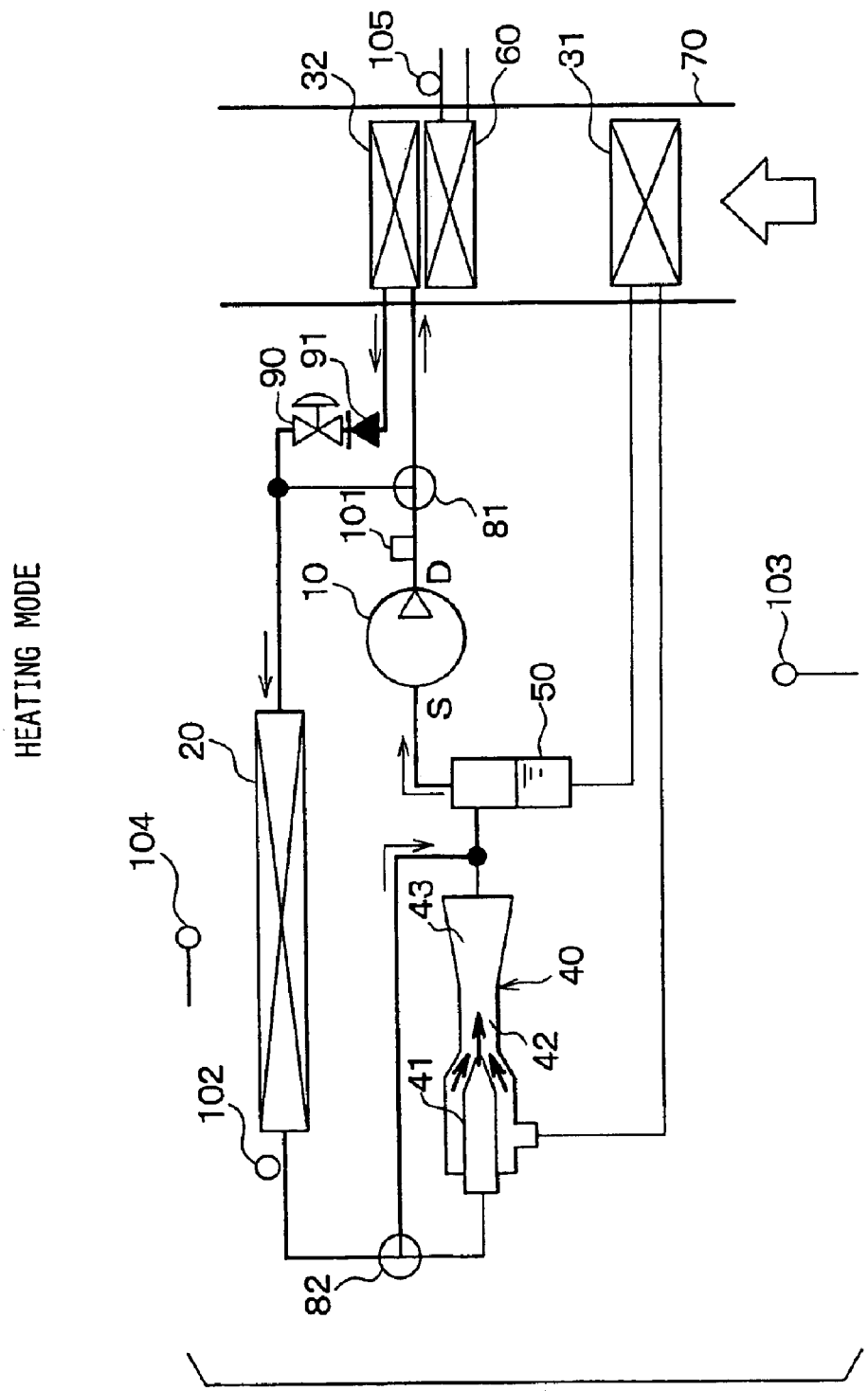
FIG. 3 is a schematic diagram showing a refrigerant flow in the vapor-compression refrigerant cycle system in a heating mode, according to the first embodiment.

The rotation speed of the compressor 10, that is, refrigerant amount discharged from the compressor 10 is controlled to a target control value. Generally, in the cooling mode, the target control value is determined based on the refrigerant pressure detected by the pressure sensor 101, the outside air temperature detected by the outside air temperature sensor 104, the high-pressure refrigerant temperature detected by the refrigerant temperature sensor 102 and inside air temperature detected by the inside air temperature sensor 103. Accordingly, the cooling capacity of the first interior heat exchanger 31 can be suitably controlled.
(2) Heating Mode When the heating mode is set, the first and second three-way valves 81, 82 are operated so that the refrigerant discharged from the compressor 10 is directly supplied to the second interior heat exchanger 32 and the refrigerant flowing out of the exterior heat exchanger 20 is directly supplied to the gas-liquid separator 50 while bypassing the ejector 40, as shown in FIG. 3. Therefore, high-temperature high-pressure refrigerant (hot-gas refrigerant) discharged from the compressor 10 flows into the second interior heat exchanger 32, and air to be blown into the vehicle compartment is heated in the second interior heat exchanger 32 by using the hot gas refrigerant as a-heating source.

Refrigerant flowing out of the second interior heat exchanger 32 is decompressed and expanded in iso-enthalpy by the constant-pressure control valve 90. Then, the refrigerant decompressed in the constant-pressure control valve 90 flows into the exterior heat exchanger 20, and is evaporated by absorbing heat from the outside air in the exterior heat exchanger 20. The evaporated refrigerant from the exterior heat exchanger 20 flows into the gas-liquid separator 50 while bypassing the ejector 40.

In this embodiment, when the heating mode is set, the hot gas refrigerant is supplied to the second interior heat exchanger 32 while the engine-cooling water is supplied to the heater core 60. When the temperature of the engine cooling water supplied to the heater core 60 is sufficiently increased so that the heating operation can be performed only using the heater core 60, the supply of the hot gas refrigerant to the second interior heat exchanger 32 is stopped.

According to the present invention, when the high-pressure refrigerant discharged from the compressor 10 is supplied to the second interior heat exchanger 32, the constant-pressure control valve 90 is controlled so that the pressure of the high-pressure refrigerant becomes equal to or higher than the predetermined pressure. Accordingly, even when the thermal load conditions at the high-pressure side and the low-pressure side are changed, it can restrict the heating capacity of the second interior heat exchanger 32, heating air, from being greatly changed. Therefore, the heating capacity for heating the vehicle compartment can be effectively improved.

Figure 4:
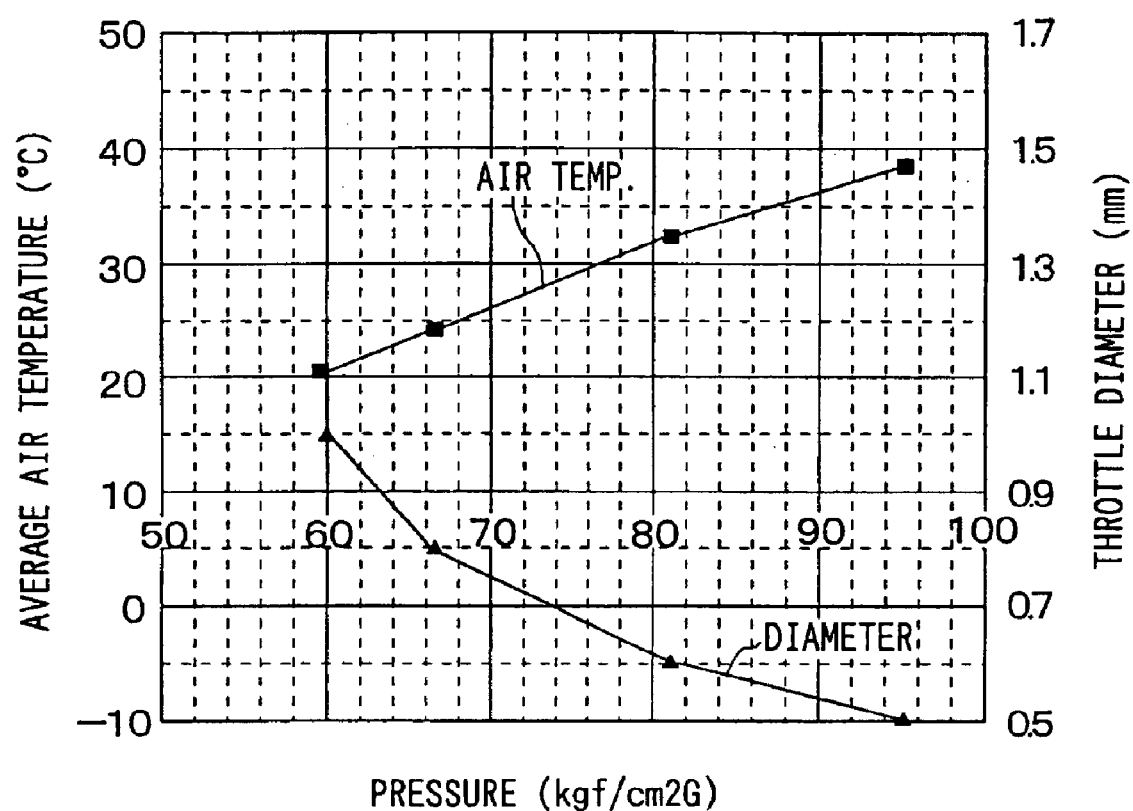
FIG. 4 is a graph showing the relationships between a pressure of high-pressure refrigerant, a throttle diameter (throttle open degree) of a constant-pressure control valve and an average air temperature, according to the first embodiment.

FIG. 4 shows experiment results of the air temperature to be blown into the vehicle compartment, when the pressure of the high-pressure refrigerant is changed while the thermal load is set at a constant value. Further, in FIG. 4, the throttle diameter (throttle open degree) of the constant-pressure control valve 90 is set, so that warm air having a temperature higher than the body temperature of a passenger can be obtained at a time immediately after 1 minute after the heating more starts. In FIG. 4, the air temperature to be blown into the vehicle compartment is an average air temperature at four points.

As shown by the graph in FIG. 4, as the throttle diameter (throttle open degree) of the constant-pressure control valve 90 becomes smaller, the temperature and the pressure of refrigerant in the second interior heat exchanger 32 becomes higher, and the heating capacity is improved. When the throttle diameter of the constant-pressure control valve 90 is reduced, the refrigerant flow amount flowing into the second interior heat exchanger 32 is also reduced. However, in this case, the pressure increase of the refrigerant in the second interior heat exchanger 32 is larger as compared with the decrease of the refrigerant flow amount. Accordingly, when the throttle open degree (throttle diameter) of the constant-pressure control valve 90 is decreased, the pressure of the high-pressure refrigerant is increased, and the heating capacity of the second interior heat exchanger 32, for heating air, can be improved.

In this embodiment, the second interior heat exchanger 32 is arranged downstream from the heater core 60. Therefore, air to be blown into the vehicle compartment can be effectively heated in the heating mode.

Second Embodiment

In the above-described first embodiment of the present invention, the three-way valve 81 switches one of the operation state (second mode) where the high-pressure refrigerant discharged from the compressor 10 is supplied to the second interior heat exchanger 32 and the operation state (first mode) where the high-pressure refrigerant discharged from the compressor 10 is supplied to the exterior heat exchanger 20. However, in the second embodiment, a two-way valve 81a and a two-way valve 81b are used instead of the first three-way valve 81. The two-way valve 81a is provided for opening and closing a first refrigerant passage connecting the compressor 10 and a refrigerant inlet of the second interior heat exchanger 32, and the two-way valve 81b is provided for opening and closing a second refrigerant passage connecting the compressor 10 and a refrigerant inlet of the exterior heat exchanger 20.

When the cooling mode is set, the two-way valve 81a is fully closed and the two-way valve 81b is fully opened. In contrast, when the heating mode is set, the two-way valve 81a is fully opened and the two-way valve 81b is fully closed.

Figure 5:
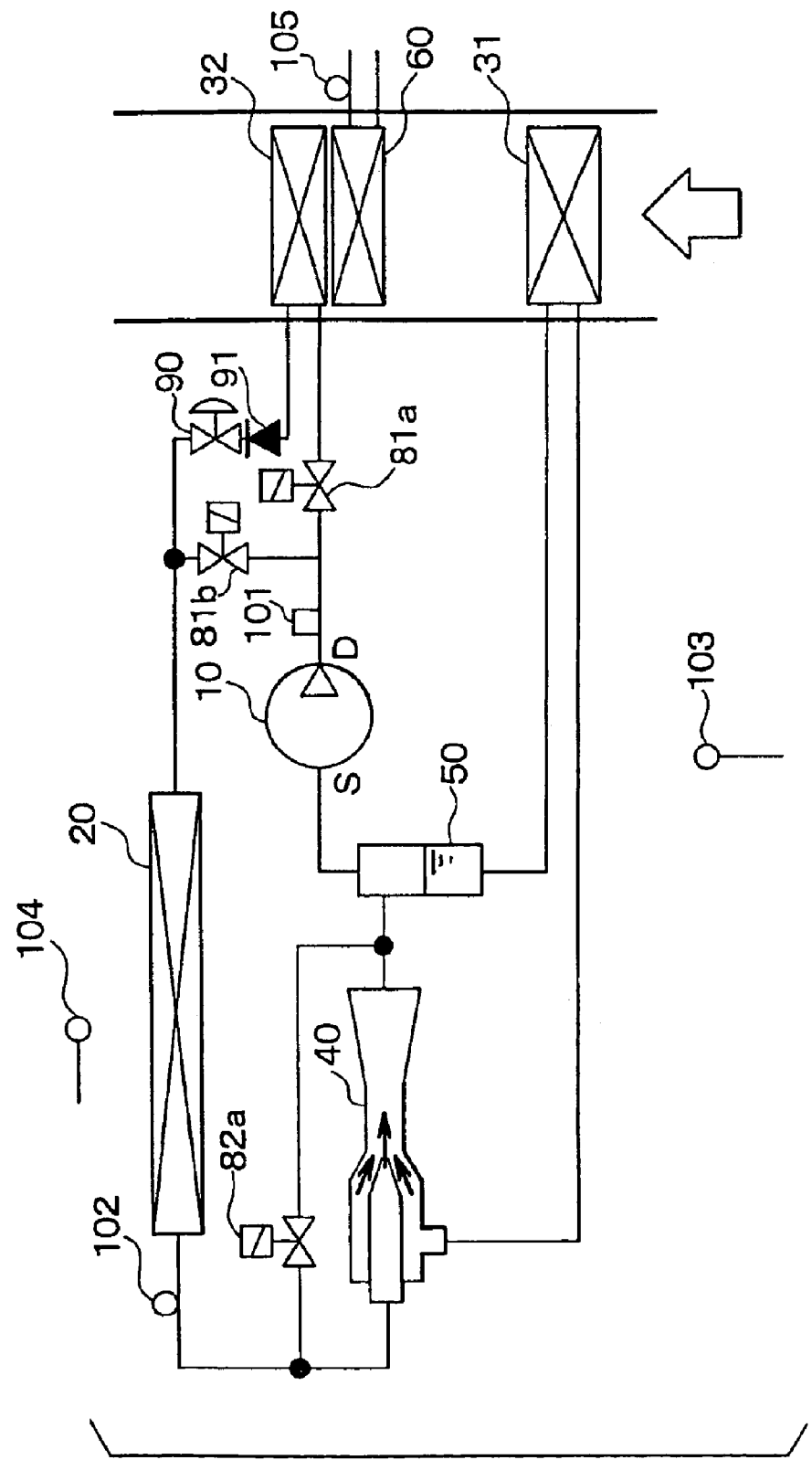
FIG. 5 is a schematic diagram showing a vapor-compression refrigerant cycle system used for an air conditioner, according to a second preferred embodiment of the present invention.
Figure 6:
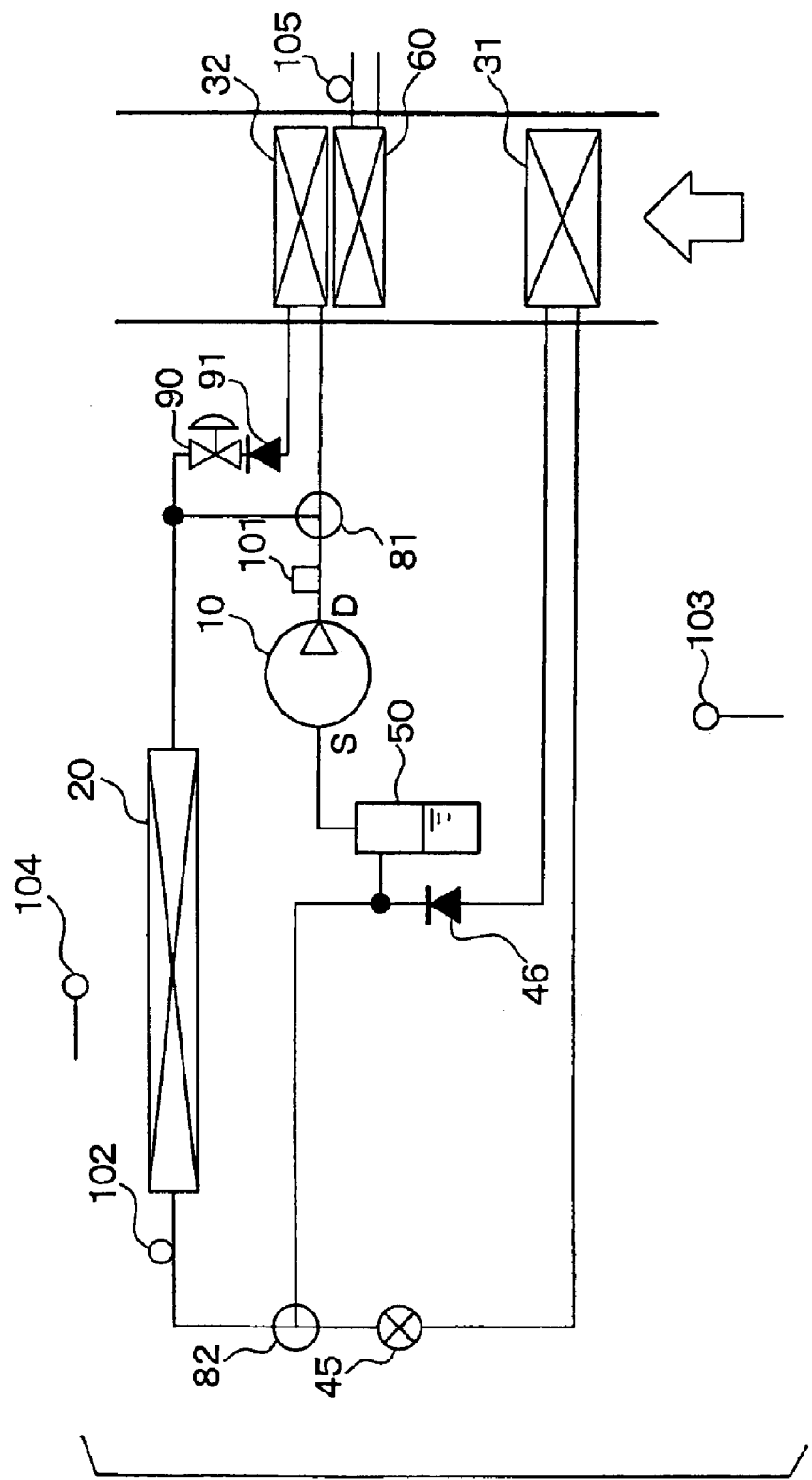
FIG. 6 is a schematic diagram showing a vapor-compression refrigerant cycle system used for an air conditioner, according to a third preferred embodiment of the present invention.

Further, instead of the second three-way valve 82, a two-way valve 82a can be used as shown in FIG. 5. The two-way valve 82a is provided in the bypass passage through which refrigerant from the exterior heat exchanger 20 flows into the gas-liquid separator 50 while bypassing the ejector 40. In the second embodiment, when the cooling mode is set, the two-way valve 82a is closed so that refrigerant from the exterior heat exchanger 20 flows into the nozzle 41 of the ejector 40. In contrast, when the heating mode is set, the two-way valve 82a is fully opened so that the refrigerant from the exterior heat exchanger 20 flows into the gas-liquid separator 50 while bypassing the ejector 40. Because the pressure loss in the nozzle 41 of the ejector 40 is greatly larger than that in the bypass passage when the two-way valve 82a is fully opened, refrigerant from the exterior heat exchanger 20 does not flow into the nozzle 41 of the ejector 40 in the heating mode.

In the second embodiment, the two-way valves 81a, 81b, 82a are controlled by the electronic control unit. Further, the other parts are similar to those of the above-described first embodiment. Therefore, advantages described in the first embodiment can be obtained.

Third Embodiment

In the above-described first and second embodiments of the present invention, in the cooling mode, the refrigerant flowing from the exterior heat exchanger 20 is decompressed in the nozzle 41 of the ejector 40. However, in the third embodiment, in the cooling mode, the refrigerant flowing from the exterior heat exchanger 20 is decompressed and expanded in iso-enthalpy by a decompression unit 45. As the decompression unit 45, a thermal expansion valve or a fixed throttle device can be used.

A check valve 46 is provided to prevent the refrigerant from the exterior heat exchanger 20 from flowing into the first interior heat exchanger in the heating mode.

When the heating mode is set, the first three-way valve 81 is operated so that the refrigerant discharged from the compressor 10 flows into the second interior heat exchanger 32 and the constant-pressure control valve 90. Further, the second three-way valve 82 is operated so that refrigerant from the exterior heat exchanger directly flows into the gas-liquid separator 50 while bypassing the decompression device 45. Accordingly, in the heating mode, similarly to the first embodiment, air passing through the second interior heat exchanger 32 is heated by using hot gas refrigerant as the heating source. Further, in the heating mode, the constant-pressure control valve 90 is controlled so that the pressure of the high-pressure refrigerant becomes equal to or higher than the predetermined pressure.

When the cooling mode is set, the first three-way valve 81 is operated so that the refrigerant discharged from the compressor 10 flows into the exterior heat exchanger 20. Further, the second three-way valve 82 is operated so that refrigerant from the exterior heat exchanger 20 is introduced into the decompression device 45. Accordingly, in the cooling mode, refrigerant discharged from the compressor 10 is cooled in the exterior heat exchanger 20, is decompressed in the decompression device 45, and is evaporated in the first interior heat exchanger 31. That is, low-pressure refrigerant from the decompression device 45 is evaporated in the first interior heat exchanger 31 by absorbing heat from air to be blown into the vehicle compartment. Therefore, air to be blown into the vehicle compartment is cooled in the cooling mode.

In the third embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described embodiments, the vapor-compression refrigerant cycle system is used for the air conditioner where the temperature of air to be blown into the vehicle compartment is not controlled by an air mixing door. However, the vapor-compression refrigerant cycle system can be used for an air-mixing type air conditioner where the temperature of air to be blown into the passenger compartment is adjusted by an air mixing door.

In the above-described embodiments, the hot gas refrigerant is introduced into the second interior heat exchanger 32 while the engine cooling water is circulated in the heater core 60, in the heating mode. However, when the temperature of the engine-cooling water is lower than a predetermined temperature, the circulation of the engine cooling water to the heater core 60 can be stopped. When the temperature of the engine cooling water becomes higher than the predetermined temperature, the engine cooling water is circulated to the heater core 60. In this case, the supply of the hot gas refrigerant to the second interior heat exchanger 32 can be stopped in accordance with a request heating capacity.

In the above-described embodiments, the pressure of the high-pressure refrigerant before being decompressed is controlled by controlling the throttle open degree of the constant-pressure control valve 90. However, in the heating mode, the pressure of the high-pressure refrigerant before being decompressed can be controlled to be higher than the predetermined pressure by controlling the rotation speed of the compressor 10, that is, by controlling a discharge flow amount of the compressor 10 while the throttle open degree of the constant-pressure control valve 90 is fixed. Further, the other pressure control device, for controlling the pressure of the high-pressure refrigerant to be higher than the predetermined pressure in the heating mode, can be used instead of the constant-pressure control valve 90.

In the above-described embodiments, the constant-pressure control valve 90 is a mechanical type. However, an electrical variable throttle can be used as the constant-pressure control valve 90. In this case, the throttle open degree of the electrical variable throttle can be electrically controlled so that the refrigerant pressure detected by the pressure sensor 101 becomes higher than the predetermined pressure.

In the above-described embodiments, the vapor-compression refrigerant cycle system is typically used for a vehicle air conditioner; however, the vapor-compression refrigerant cycle system can be used for the other uses. Further, in the above-described embodiments, carbon dioxide is used as the refrigerant, and the pressure of the high-pressure refrigerant is increased more than the critical pressure of the refrigerant in according with the thermal load in the vapor-compression refrigerant cycle system. However, the other refrigerants other than carbon dioxide can be used. For example, Freon or carbon hydride can be used as the refrigerant.

Such changes and modifications are to be understood as being within the scope of the present invention as defined by the appended claims.

What is claimed is:

1. A vapor-compression refrigerant cycle system comprising:
    a compressor for drawing and compressing refrigerant;
    an exterior heat exchanger disposed outside a compartment to perform heat exchange between refrigerant and air outside the compartment;
    an interior heat exchanger disposed inside the compartment to perform heat exchange between refrigerant and air to be blown into the compartment;
    first switching means disposed to switch one of a first mode where refrigerant discharged from the compressor is supplied to the exterior heat exchanger and a second mode where the refrigerant discharged from the compressor is supplied to the interior heat exchanger;
    a pressure control device which controls a pressure of the refrigerant discharged from the compressor to be higher than a predetermined pressure when the second mode is set by the switching means;
    an ejector which includes a nozzle for decompressing and expanding refrigerant, and a pressure-increasing portion which draws gas refrigerant evarporated at a low-pressure side by a refrigerant stream jetted from the nozzle and increases a refrigerant pressure to be sucked to the compressor by converting expansion energy to pressure energy; and a gas-liquid separator for separating refriaerant flowing from the ejector into gas refrigerant and liquid refrigerant, the gas-liquid separator having a gas refrigerant outlet coupled to the compressor and a liquid refrigerant outlet coupled to the low-pressure side, wherein:

the nozzle decompresses the refrigerant flowing from the exterior heat exchanger when the first mode is set by the switching means; and the pressure control device is a throttle device which controls the pressure of the refrigerant discharged from the compressor and decompresses the refrigerant flowing from the interior heat exchanger when the second mode is set by the switching means.

2. The vapor-compression refrigerant cycle system according to claim 1, further comprising an evaporator for evaporating refrigerant supplied from the liquid refrigerant outlet of the gas-liquid separator, wherein:

the evaporator is disposed to cool the air to be blown into the compartment in the first mode; and the evaporator has a refrigerant outlet coupled to a suction port of the ejector, through which gas refrigerant evaporated in the evaporator is drawn into the pressure increasing portion of the ejector.

3. The vapor-compression refrigerant cycle system according to claim 1, further comprising second switching means for switching a flow of the refrigerant from the exterior heat exchanger to one of the nozzle of the ejector and the gas-liquid separator.

4. The vapor-compression refrigerant cycle system according to claim 1, further comprising decompression means for decompressing refrigerant flowing out of the exterior heat exchanger in iso-enthalpy in the first mode;

5. The vapor-compression refrigerant cycle system according to claim 4, wherein the throttle device has a throttle open degree that is controllable such that the pressure of the refrigerant discharged from the compressor becomes higher than the predetermined pressure in the second mode.

6. The vapor-compression refrigerant cycle system according to claim 1, wherein carbon dioxide is used as the refrigerant.

7. The vapor-compression refrigerant cycle system according to claim 1, wherein the refrigerant discharged from the compressor is equal to or higher than the critical pressure of the refrigerant.

8. The vapor-compression refrigerant cycle system according to claim 1, wherein:

the compartment is a passenger compartment of a vehicle;

the interior heat exchanger is disposed in an air conditioning case for defining an air passage through which air flows into the passenger compartment;

the air conditioning case having therein a heater core for heating air in the air passage by using exhaust heat generated in the vehicle as a heat source; and the interior heat exchanger is disposed downstream from the heater core in an air flow direction in the air conditioning case.

9. The vapor-compression refrigerant cycle system according to claim 8, further comprising an evaporator for evaporating refrigerant on the low-pressure side by absorbing heat from air flowing through the air passage, wherein the evaporator is disposed in the air conditioning case upstream from the heater core in the air flow direction.

* * * * *